US012541644B2

(12) United States Patent
Zhiltsova

(10) Patent No.: US 12,541,644 B2
(45) Date of Patent: Feb. 3, 2026

(54) METHODS AND APPARATUSES FOR LANGUAGE TRANSLATION TO IDENTIFY CONTEXTUAL SYNONYMS

(71) Applicant: iCIMS, Inc., Holmdel, NJ (US)

(72) Inventor: Alina Zhiltsova, Dublin (IE)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 18/452,139

(22) Filed: Aug. 18, 2023

(65) Prior Publication Data

US 2025/0061275 A1     Feb. 20, 2025

(51) Int. Cl.
*G06F 40/247*     (2020.01)
*G06F 40/58*     (2020.01)
*G06Q 10/1053*     (2023.01)

(52) U.S. Cl.
CPC ............ *G06F 40/247* (2020.01); *G06F 40/58* (2020.01); *G06Q 10/1053* (2013.01)

(58) Field of Classification Search
CPC ...... G06F 40/247; G06F 40/58; G06F 40/242; G06Q 10/1053
See application file for complete search history.

(56) References Cited

U.S. PATENT DOCUMENTS

| | | |
|---|---|---|
| 8,515,731 B1 | 8/2013 | Ramirez Robredo et al. |
| 2013/0173247 A1* | 7/2013 | Hodson ................ G06F 40/45 704/4 |
| 2016/0350289 A1* | 12/2016 | Zhao ..................... G06F 40/45 |
| 2017/0083510 A1* | 3/2017 | Dixon ................... G06F 40/44 |
| 2017/0220561 A1* | 8/2017 | Fujiwara ............... G06F 40/45 |
| 2018/0089169 A1* | 3/2018 | Yamauchi ............ G06F 40/151 |
| 2022/0327487 A1 | 10/2022 | Vontobel et al. |

OTHER PUBLICATIONS

[Author Unknown] "Named-entity recognition" Wikipedia [online] https://en.wikipedia.org/wiki/Named-entity_recognition (Access Date: Aug. 23, 2023); 7 pages.
Vanderbilt et al. "A prototype system for multilingual data discovery of International Long-Term Ecological Research (ILTER) Network data," Ecological Informatics, Jul. 2017, 40:93-101.
International Search Report and Written Opinion for International Application No. PCT/US2024/042778, by Icims, Inc., mailed Dec. 2, 2024; 17 Pages.

* cited by examiner

*Primary Examiner* — Angela A Armstrong
(74) *Attorney, Agent, or Firm* — COOLEY LLP

(57) ABSTRACT

A subset of text associated with an occupational code and being in a language(s) different than a predetermined language is translated to a translated subset of text that is in the predetermined language. From a plurality of sets of natural language texts associated with a plurality of occupational codes that includes the occupational code, a set of natural language texts associated with the occupational code and being in the predetermined language is identified. For each natural language text from the set of natural language texts, a similarity between the translated subset of text and that natural language text is determined. In response to the similarity being greater than a predetermined threshold, the subset of text is identified as a contextual synonym of that natural language text.

18 Claims, 4 Drawing Sheets

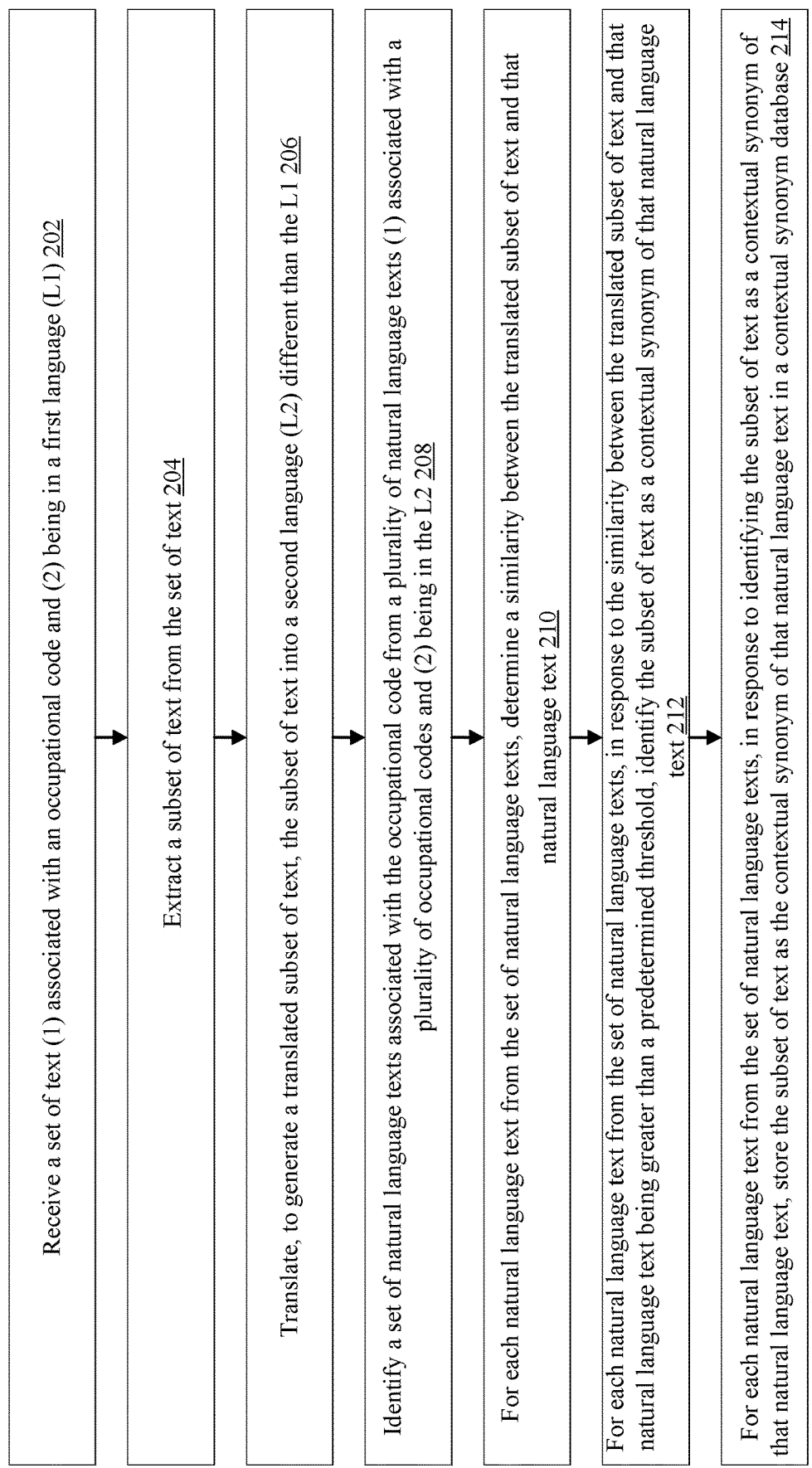

300

Receive a subset of text associated with an occupational code and being in a first language (L1) 302

↓

Translate, to generate a translated subset of text, the subset of text into a second language (L2) different than the L1 304

↓

Identify a set of natural language texts associated with the occupational code from a plurality of natural language texts (1) associated with a plurality of occupational codes and (2) being in the L2, remaining natural language texts from the plurality of natural language texts associated with remaining occupational codes from the plurality of occupational codes that does not include the occupational code 306

↓

For each natural language text from the set of natural language texts, to generate a contextual synonym database, and not for the remaining natural language texts from the plurality of natural langue texts, determine a similarity between the translated subset of text and that natural language text 308

↓

For each natural language text from the set of natural language texts, in response to the similarity between the translated subset of text and that natural language text being greater than a predetermined threshold, identify the subset of text as a contextual synonym of that natural language text in the contextual synonym database 310

FIG. 3

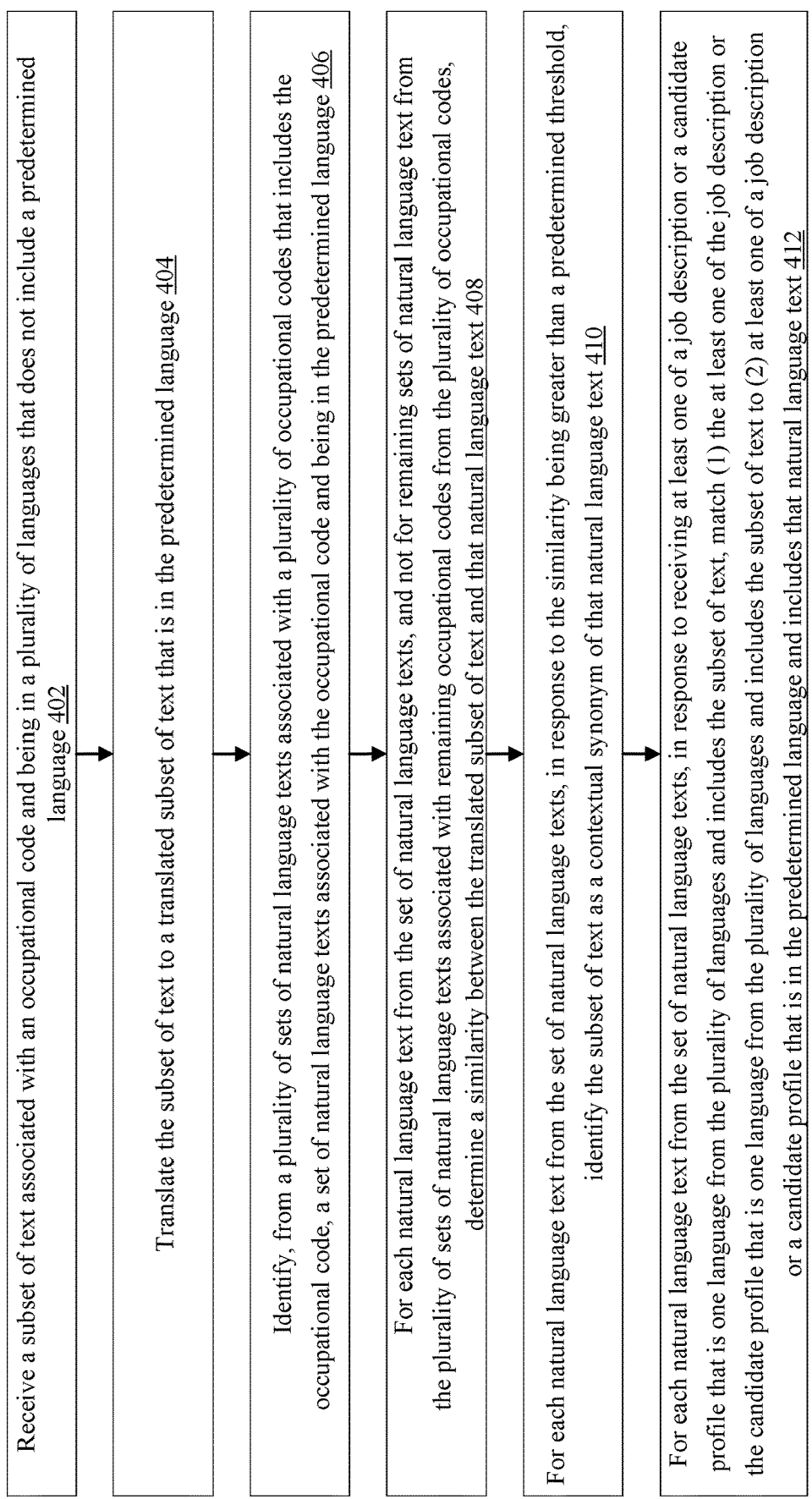

METHODS AND APPARATUSES FOR LANGUAGE TRANSLATION TO IDENTIFY CONTEXTUAL SYNONYMS

FIELD

One or more embodiments are related to methods and apparatuses for language translation to identify contextual synonyms.

BACKGROUND

In a job description context, it can be desirable to a hiring manager that all candidates that match (i.e., are a good fit) to the job description are considered. Likewise, in a job searching process, it can be desirable to a candidate that all job descriptions they match to are considered. When one of the job description (e.g., for a job opening) or candidate information is in a first language (e.g., English) and the other of the job description or candidate information is in a second language (e.g., French), however, matching can be more difficult. Some known techniques convert a phrase from the first language to the second language and compare to see if the translation matches; such a technique, however, does not account for the fact that the second language may have multiple different ways to say the phrase in the first language. For example, a job description for a "bus driver" that only searches for candidate profiles including "conducteur de bus" (which stands for "bus driver" in French) may ignore candidate profiles that instead include "chauffeur de bus" (which also stands for "bus driver" in French). It is desirable to consider all variants to describe a skill or a title during the matching process and for those variants to be not just word for word translations but phrases that a native speaker would use. Accordingly, a system to better match job descriptions and job candidates can be desirable, particularly in a multilingual society.

SUMMARY

In an embodiment, a non-transitory medium stores code representing instructions to be executed by one or more processors. The instructions comprise code to cause the one or more processors to receive a set of text (1) associated with an occupational code and (2) being in a first language (L1). The instructions further comprise code to cause the one or more processors to extract a subset of text from the set of text. The instructions further comprise code to cause the one or more processors to translate, to generate a translated subset of text, the subset of text into a second language (L2) different than the L1. The instructions further comprise code to cause the one or more processors to identify a set of natural language texts associated with the occupational code from a plurality of natural language texts (1) associated with a plurality of occupational codes and (2) being in the L2. The instructions further comprise code to cause the one or more processors to, for each natural language text from the set of natural language texts, determine a similarity between the translated subset of text and that natural language text. The instructions further comprise code to cause the one or more processors to, for each natural language text from the set of natural language texts, in response to the similarity between the translated subset of text and that natural language text being greater than a predetermined threshold, identify the subset of text as a contextual synonym of that natural language text. The instructions further comprise code to cause the one or more processors to, for each natural language text from the set of natural language texts and in response to identifying the subset of text as a contextual synonym of that natural language text, store the subset of text as the contextual synonym of that natural language text in a contextual synonym database.

In an embodiment, an apparatus includes a memory and a processor operatively coupled to the memory. The processor is configured to receive a subset of text associated with an occupational code and being in a first language (L1). The processor is further configured to translate, to generate a translated subset of text, the subset of text into a second language (L2) different than the L1. The processor is further configured to identify a set of natural language texts associated with the occupational code from a plurality of natural language texts (1) associated with a plurality of occupational codes and (2) being in the L2. Remaining natural language texts from the plurality of natural language texts are associated with remaining occupational codes from the plurality of occupational codes that does not include the occupational code. The processor is further configured to, for each natural language text from the set of natural language texts, to generate a contextual synonym database, and not for the remaining natural language texts from the plurality of natural langue texts, determine a similarity between the translated subset of text and that natural language text. The processor is further configured to, for each natural language text from the set of natural language texts, identify the subset of text as a contextual synonym of that natural language text in the contextual synonym database in response to the similarity between the translated subset of text and that natural language text being greater than a predetermined threshold.

In an embodiment, a method includes receiving, via a processor, a subset of text associated with an occupational code and being in a plurality of languages that does not include a predetermined language. The method further includes translating, via the processor, the subset of text to a translated subset of text that is in the predetermined language. The method further includes identifying, via the processor and from a plurality of sets of natural language texts associated with a plurality of occupational codes that includes the occupational code, a set of natural language texts associated with the occupational code and being in the predetermined language. The method further includes, for each natural language text from the set of natural language texts, and not for remaining sets of natural language text from the plurality of sets of natural language texts associated with remaining occupational codes from the plurality of occupational codes, determining, via the processor, a similarity between the translated subset of text and that natural language text. The method further includes, in response to the similarity being greater than a predetermined threshold, identifying, via the processor, the subset of text as a contextual synonym of that natural language text. The method further includes, in response to receiving at least one of a job description or a candidate profile that is one language from the plurality of languages and includes the subset of text, matching (1) the at least one of the job description or the candidate profile that is one language from the plurality of languages and includes the subset of text to (2) at least one of a job description or a candidate profile that is in the predetermined language and includes that natural language text.

BRIEF DESCRIPTION OF THE DRAWINGS

FIG. 2 shows a flowchart of a method to compare a subset of text in a first language (L1) to various natural language texts in a second language (L2) to determine if they are contextual synonyms of each other, according to an embodiment.

FIG. 3 shows a flowchart of a method to determine that a subset of text in a first language is a contextual synonym of text in a second language, according to an embodiment.

FIG. 4 shows a flowchart of a method to determine that a subset of text being in multiple languages is a contextual synonym of natural language text that is in a language different than the multiple languages of the subset of text, according to an embodiment.

DETAILED DESCRIPTION

Figure 1:
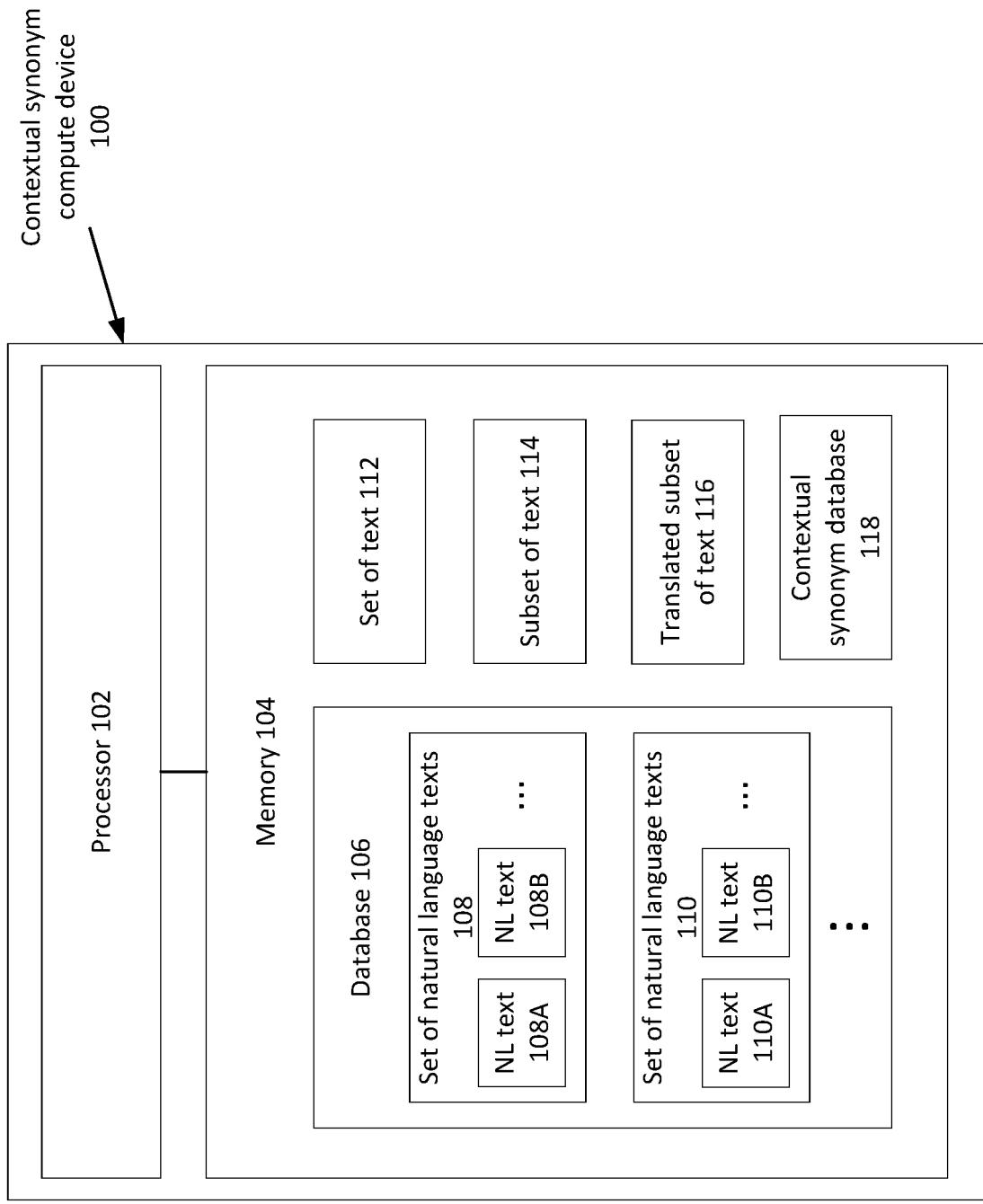
FIG. 1 shows a block diagram of a system for building and using a contextual synonym database, according to an embodiment.

A word or phrase in one language can be said in multiple different ways in a different language. Said differently, a word or phrase in one language can have multiple different contextual synonyms in a different language. For example, "bus driver" in English can be a contextual synonym of both "conducteur de bus" and "chauffeur de bus" in French. As another example, "chef" in English can be a contextual synonym of "cocinera" and "cocinero" in Spanish (cocinera is the feminine version and concinero is the masculine version). As yet another example, "ingeniero de software" in Spanish can be a contextual synonym of "software engineer." "programmer," and "coder" in English.

Accordingly, some implementations herein are related to generating a contextual synonym database. Words/phrases in a first language can be compared to a subset of words/phrases that are in a database (different than the contextual synonym database) and in a second language. The words/phrases in the first language can be translated into the second language and compared to the subset of words/phrases in the database (different than the contextual synonym database) in the second language. If they are sufficiently similar, both of the words/phrases can be identified as contextual synonyms of one other within the contextual synonym database. Such a process can be repeated for any number of words/phrases for any number of languages. Upon generation of the contextual synonym database, the contextual synonym database can be used in a variety of applications, including but not limited to a job description/job search context.

In some implementations, a "job description" refers to a text description (e.g., 0.5 page long, 1 page long. 2 pages long, and/or the like) for a position opening. The position opening can be for any type of position, such as a job, contractor position, paid internship, unpaid internship, volunteer role, and/or the like. In some implementations, a "contextual synonym" refers to a word or phrase (e.g., representing job skills or job titles for a job description or job candidate) in one language so similar to a word or phrase in a different language or the same language that they can be interchangeable for a given predetermined purpose (e.g., job recruitment purposes). In some implementations, a "candidate profile" refers to a description of a person's skill and/or experience, such as a soft skill, hard skill, prior experience, accolade, certification, personal attribute, and/or the like. Examples of candidate profiles include resumes, cover letters, and/or the like.

FIG. 1 shows a block diagram of a system for building and using a contextual synonym database, according to an embodiment. FIG. 1 includes a contextual synonym compute device 100. Contextual synonym compute device 100 can be any type of compute device, such as a server, desktop, laptop, tablet, mobile device, smart device, internet-of-things (IoT) device, and/or the like. Contextual synonym compute device 100 can include processor 102 operatively coupled to memory 104 (e.g., via a system bus).

Processor 102 can be, for example, a hardware-based integrated circuit (IC) or any other suitable processing device configured to run and/or execute a set of instructions or code. For example, processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 102 can be configured to run any of the methods and/or portions of methods discussed herein.

Memory 104 can be, for example, a random-access memory (RAM), a memory buffer, a hard drive, a read-only memory (ROM), an erasable programmable read-only memory (EPROM), and/or the like. Memory 104 can be configured to store any data used by the processors to perform the techniques (methods, processes, etc.) discussed herein. In some instances, memory 104 can store, for example, one or more software programs and/or code that can include instructions to cause the processors to perform one or more processes, functions, and/or the like. In some implementations, memory 104 can include extendible storage units that can be added and used incrementally. In some implementations, memory 104 can be a portable memory (for example, a flash drive, a portable hard disk, and/or the like) that can be operatively coupled to the processors. In some instances, memory 104 can be remotely operatively coupled with a compute device (not shown in FIG. 1).

Memory 104 can include (e.g., store) database 106. Database 106 can include (e.g., store) multiple sets of natural language (NL) texts that are all in a first language (e.g., English), such as set of NL texts 108, set of NL texts 110, and so on. Each set of NL texts stored in database 106 can be associated with an occupational code (e.g., code from Standard Occupational Classification System) different than remaining sets of NL texts included in database 106. For example, set of NL texts 108 can be associated with a first occupational code (e.g., code for computer and mathematical occupations), set of NL texts 110 can be associated with a second occupational code different than the first occupational code (e.g., code for legal occupations), and so on.

For each set of NL texts included database 106, that set of NL texts can include NL texts (being in the first language) associated with (e.g., commonly used in) the occupational code for that set of NL texts, such as NL text 108A, NL text 108B, NL text 110A, NL text 110B, etc., For example, if set of NL texts 108 is associated with an occupational code for computer and mathematical occupations, NL text 108A can be associated with a phrase common in computer and mathematical occupations (e.g., "software developer"), NL text 108B can be associated with a phrase common in computer and mathematical occupations (e.g., "proficient in C++"), and so on. Similarly, if set of NL texts 110 is associated with an occupational code for legal occupations, NL text 110A can be associated with a phrase common in legal occupations (e.g., "litigation paralegal"), NL text 110B can be associated with a phrase common in legal occupations (e.g., "experience conducting depositions"), and so on.

In some implementations, NL texts (e.g., NL text 108A, 108B, 110A, and/or 110B) are words or phrases used in a job description/job search process. The NL texts could describe a skill and/or experience, such as a soft skill, hard skill, prior experience, accolade, certification, personal attribute, and/or the like. NL texts are not limited to a specific type of speech, and can be a noun, adjective, verb, and/or the like. Examples include "hard worker", "ambitious", "organized", "proficient in Spanish", "master's degree in electrical engineering", "teacher", "programmer at Google", "private chef", "volunteer at food bank", "member of robotics team", "programming in Python", "hiring tech professionals", and/or the like.

Memory 104 can also include (e.g., store) set of text 112. Set of text 112 can include text that is in a second language(s) different than the first language. For example, set of text 112 could be in Spanish, French, German, Italian, and/or the like. In some implementations, set of text 112 is a set of text associated with (e.g., used for) a job description/job search process. For example, set of text 112 could be a job description for a job opening, profile for a job candidate (e.g., resume, cover letter), and/or the like.

Set of text 112 can be associated with an occupational code. For example, if set of text 112 is a job description, the entity posting the job description may have provided an occupational code with the job description. As another example, if set of text 112 is a candidate profile for a job opening and the job opening is associated with an occupational code, the candidate profile can also become associated with the same occupational code. As another example, a human (e.g., hiring manager, person seeking employment, etc.) may use their compute device to provide the occupational code (e.g., by selecting from a drop down list, answering a predetermined set of questions, etc.) to contextual synonym compute device 100 and/or a compute device communicatively coupled to contextual synonym compute device 100 via a network (not shown in FIG. 1) and a network interface (not shown in FIG. 1) of contextual synonym compute device 100.

In some implementations, an artificial intelligence (AI) model can be trained to determine an occupational code based on a set of text. For example, a neural network can be trained using various sets of text as input learning data and occupational codes associated with those sets of text as target learning data.

Subset of text 114 can be included in and extracted from (e.g., using named entity recognition) set of text 112. Subset of text 114 can be for example a word or phrase used in a job description/job search process. For example, subset of text 114 may be "capocuoco" ("chef" in Italian), "ambitieuse" ("ambitious" in French), "maestría en ingeniería eléctrica" ("master's degree in electrical engineering" in Spanish), or "fließend Englisch" ("fluent in English" in German).

Memory 104 can also include (e.g., store) translated subset of text 116. Translated subset of text 116 can be a translation of subset of text 114 into the first language. In other words, subset of text 114 can be translated to be in the same language as the NL texts in database 106. Any type of translation technique can be used to generate translated subset of text 116 from subset of text 114. In some implementations, translated subset of text 116 is generated based on subset of text 114 without human intervention. In some implementations, translated subset of task 116 is generated based on subset of text 114 with human intervention.

The occupational code associated with set of text 112 can be used to identify a set of NL text from database 106 with the same occupational code. For the set of NL text associated with the same occupational code as set of text 112 (and not for any sets of NL text in database 106 not associated with the same occupational code as set of text 112), each NL text included in the set of NL text can be compared with translated subset of text 116 for similarity (e.g., using cosine similarity, Euclidean distance, Jaccard similarity, and/or the like); if the similarity is above a predetermined threshold, that NL text is identified by contextual synonym compute device 100 as a contextual synonym of subset of text 114 in contextual synonym database 118 (and vice versa, where the NL text is identified as not a contextual synonym of subset of text in contextual synonym database 118 if the similarity is below the predetermined threshold). In some implementations, determining similarity between NL text and a translated subset of text can include vectorizing the NL text, vectorizing the translated subset of text, and computing a similarity between the vectors.

Such a process as described above can be repeated for any number of words or phrases and any number of languages. As such, contextual synonym database 118 can grow to include any number of contextual synonyms for any number of languages and/or additional contextual synonym databases not shown in FIG. 1 can be generated.

Contextual synonym compute device 100 can be used to identify contextual synonyms of words or phrases in the first language with words or phrases in the second language (and vice versa). In a job description/job search context, techniques described herein can find more job descriptions that are a match for a candidate and/or more job candidates that are a match for a job description.

In one example, contextual synonym database 118 has been expanded with and storing contextual synonym terms to the point that "conducteur de bus" and "chauffeur de bus" are both similar enough to "bus driver" to be considered contextual synonyms of each other. Therefore, a job description in English for a "bus driver" can identify candidate profiles in French that include "conducteur de bus" or "chauffeur de bus." Accordingly, both candidate profiles can be matched (e.g., identified as being a potentially desirable candidate) to the job description. Unlike known methods that translate "bus driver" to only one of "conducteur de bus" or "chauffeur de bus," and thus might not identify candidate profiles that include the other of "conducteur de bus" or "chauffeur de bus," the generation and usage of contextual synonym database 118 allows more candidate profiles to be identified.

In some implementations, after a candidate profile(s) has been matched to a job description(s) using contextual synonym database 118, the candidate profile(s) and/or job description(s) can be caused to be displayed by contextual synonym compute device 100 (e.g., at contextual synonym compute device 100, at a compute device(s) of the candidate, at the compute device(s) of the hiring manager, etc.). The matches can include more relevant candidate profiles and/or job descriptions compared to known methods, since profiles and descriptions in other languages and their various contextual synonyms are accounted for.

In some implementations, the threshold to determine if an NL text (e.g., NL text 108A) and translated subset of text (e.g., translated subset of text 116) are similar enough to be contextual synonyms can vary based on the language of the NL text, the language of the set of text (e.g., set of text 112) and subset of text (e.g., subset of text 114), and/or the occupational code associated with the set of text. For example, two or more terms might be considered contextual synonyms for one occupational code but not for another occupational code. By using different thresholds depending on the situation, contextual synonym compute device 100 can more accurately account for nuances amongst languages and occupational codes, resulting in a better determination of whether pairs of words/phrases are contextual synonyms of each other (and therefore further result in a more accurate contextual synonym database).

In some implementations, each subset of text (e.g., subset of text 114) includes between one word and five words. In some implementations, each subset of text includes more than five words.

In some implementations, database 106 can be modified. For example, database 106 can be modified as occupational codes change. As another example, database 106 can be modified to delete sets of NL text that have not been used a predetermined minimum number of times or have not been used for a predetermined minimum amount of time (thereby reducing a size of database 106 and resulting in memory saving). As another example, database 106 can be modified to include new sets of NL text and/or new NL text as they arise (e.g., new occupational codes are made, new types of jobs are created, new skills are in demand, etc.).

In some implementations, contextual synonyms in contextual synonym database 118 can also be grouped based on occupational code. For example, a first group in contextual synonym database 118 can include contextual synonyms associated with a first occupational code, a second group in contextual synonym database 118 can include contextual synonyms associated with a second occupational code, and so on. That way, when future subsets of texts are received, contextual synonyms for those future subsets of text can be identified by only searching the group of contextual synonym database 118 associated with the same occupational code. If, for example, a subset of text is "tax lawyer" and was extracted from a set of text associated with the occupational code "legal occupations," only the group associated with "legal occupations" in contextual synonym database 118 is searched (and not, for example, the group in contextual synonym database 118 associated with "farming, fishing, and forestry occupations").

Although some discussion with respect to FIG. 1 is in the context of job descriptions and job searches, some implementations are related to other contexts. For example, contextual synonym database 118 can be used in a search engine context where relevant webpages, images, videos, items, etc. in a first language are found for a search request in a second language. As another example, contextual synonym database 118 can be used in a language education context where a user is tasked with saying a phrase or sentence in one language using another language and the contextual synonym database 118 is used to check if the user's response is correct and common for native speakers of another language (because there can be different ways to effectively say the same thing, some of which can be outdated or too broad or too specific).

Although FIG. 1 showed a single database (database 106), in some implementations, more than one database can be used. For example, a first database can include sets of NL text in a first language, a second database can include sets of NL text in a second language different than the first language, and so on. Additionally, although FIG. 1 showed a single contextual synonym database (contextual synonym database 118), in some implementations, more than one contextual synonym database can be used. For example, a first contextual synonym database can include contextual synonyms between a first language and a second language, a second contextual synonym database can include contextual synonyms between the first language and a third language, a third contextual synonym database can include contextual synonyms between the second language and the third language, a fourth contextual synonym database can include contextual synonyms between the first language and both a fourth language and a fifth language, and so on. Additionally, in some cases contextual synonym database can store contextual synonyms across multiple pairs of languages.

Although FIG. 1 showed a single contextual synonym compute device 100, in some implementations, more than one contextual synonym compute device can be used. For example, a first contextual synonym compute device can include database 106, a second contextual synonym compute device can include contextual synonym database 118, and a third contextual synonym compute device can include set of text 112, subset of text 114, and translated subset of text 116. As another example, where multiple databases or contextual synonym databases are used, one contextual synonym compute device can store some of the databases and/or contextual synonym databases and a different contextual synonym compute device can store some of the other databases and/or contextual synonym databases. By using more than one contextual synonym compute device, the memory and processing burden/requirements within each contextual synonym compute device can be lowered.

Although FIG. 1 showed a single set of text (set of text 112), in some implementations, contextual synonym compute device 100 can receives multiple different sets of texts to generate, modify, and/or use contextual synonym database 118. In some implementations, the multiple different sets of text can be received in parallel, multiple subsets of text can be extracted in parallel, multiple translated subsets of text can be generated in parallel, similarities between the translated subsets of text and NL texts in a database can be determined in parallel, and/or the like.

In some implementations, by using an occupational code associated with set of text 112 to identify a set of NL texts from database 106 that is also associated with the occupational code, a lesser number of NL texts have to be compared to translated subset of text 116. That is because only the NL texts in the set of NL texts from database 106 associated with the same occupational code are compared to translated subset of text 116 for similarity. Said differently, not all sets of NL texts in database 106 need to be compared to translated subset of text 116 for similarity. As a result, contextual synonym compute device 100 can run faster (because not all NL texts in database 106 need to be compared for similarity against translated subset of text 116).

In those implementations where contextual synonym database 118 is grouped based on occupational code, contextual synonym database 118 can also be searched faster (e.g., compared to if contextual synonym database 118 was not grouped based on occupational code). That is because fewer NL texts and their associated subsets of texts are searched/analyzed. This can result in contextual synonym compute device 100 running faster.

In some implementations, a determination whether a set of text (e.g., set of text 112) includes a subset of text (e.g., subset of text 114) that has contextual synonyms is done without human intervention. Rather, the subset of text is extracted from the set of text without human intervention, the subset of text is translated into the translated subset of text without human intervention, and the translated subset of text is compared to NL text in the database for similarity without human intervention. Because contextual synonym compute device 100 can operate in real time (e.g., at machine speed) and does not rely on human intervention, the aforementioned processes can occur much faster.

Contextual synonym compute device 100 can identify and use contextual synonyms much faster than any human or group of humans can. As the number of sets of text increase (e.g., thousands, tens of thousands, hundreds of thousands), the speed at which contextual synonym compute device 100 can identify and use contextual synonyms will also increase relative to any human or group of humans can. Additionally, the number of sets of text, subsets of text, translated subsets of text, databases, sets of NL texts, NL text, occupational codes, thresholds, and/or the like can reach a number (e.g., millions) that is not possible (let alone practical) for humans to consider manually. Additionally, the contextual synonym compute device 100 can translate across any number of languages (e.g., 2, 3, 4, 5, 10, 15, 20, 25, 50, etc.), whereas a human can typically only translate between a couple languages at most. Said differently, the contextual synonym compute device 100 is not limited to one or two languages like a human might be. Finally, at least some steps discussed herein are different than the steps that a human(s) would perform to accomplish a similar outcome. For example, a human(s) would not need to identify a set of NL texts associated with an occupational code from a database and compare each of the NL texts in that set of NL texts to a translated subset of text to determine an amount of similarity (without comparing NL text in other sets of NL text associated with different occupational codes).

FIG. 2 shows a flowchart of a method 200 to compare a subset of text in a first language (L1) to various natural language texts in a second language (L2) to determine if they are contextual synonyms of each other, according to an embodiment. In some implementations, method 200 is performed by a processor (e.g., processor 102).

At 202, a set of text (e.g., set of text 112) (1) associated with an occupational code and (2) being in a first language (L1) is received. At 204, a subset of text (e.g., subset of text 114) is extracted from the set of text. In some implementations, 204 is performed automatically (e.g., without human intervention) in response to completing 202. At 206, the subset of text is translated into a second language (L2) different than the L1 to generate a translated subset of text (e.g., translated subset of text 116). In some implementations, 206 is performed automatically (e.g., without human intervention) in response to completing 204. At 208, a set of natural language texts (e.g., set of NL texts 108) associated with the occupational code is identified from a plurality of natural language texts (e.g., set of NL texts 108, set of NL texts 110, etc.) (1) associated with a plurality of occupational codes and (2) being in the L2. In some implementations, 208 is performed automatically (e.g., without human intervention) in response to completing 206. At 210, for each natural language text (e.g., NL text 108A, NL text 108B, etc.) from the set of natural language texts, a similarity between the translated subset of text and that natural language text is determined. In some implementations, 210 is performed automatically (e.g., without human intervention) in response to completing 208. At 212, for each natural language text from the set of natural language texts, in response to the similarity between the translated subset of text and that natural language text being greater than a predetermined threshold, the subset of text is identified as a contextual synonym of that natural language text. At 214, for each natural language text from the set of natural language texts, in response to identifying the subset of text as a contextual synonym of that natural language text, the subset of text is stored as the contextual synonym of that natural language text in a contextual synonym database (e.g., contextual synonym database 118).

Some implementations of method 200 further include, for at least one natural language text from the set of natural language texts, receiving at least one of a job description or a candidate profile that is in the L1 and includes the subset of text, and matching, using the contextual synonym database, (1) the subset of text to (2) the at least one natural language text. For example, a job description my include a subset of text that says "ingeniera de software" and candidate profiles including "software engineer," "programmer," or "coder" can be matched for being potentially desirable candidates to the job description.

In some implementations of method 200, the set of text is at least one of a candidate profile or a job description. The candidate profile or job description can be in any format, such as a document, website, image, and/or the like. If needed, any text extraction tool can be used to retrieve set of text from the candidate profile and/or the job.

In some implementations of method 200, the set of text is a first set of text, the occupational code is a first occupational code, the subset of text is a first subset of text, the set of natural language texts is a first set of natural language texts, and method 200 further includes receiving a second set of text (1) associated with a second occupational code different than the first occupational code and (2) in a third language (L3) different than the L1 and the L2. A second subset of text from the second set of text is extracted. The second subset of text is translated into the L2 to generate a second translated subset of text. A second set of natural language texts (1) associated with the second occupational code from the plurality of natural language texts, and (2) different than the first set of natural language texts is identified. For each natural language text from the second set of natural language texts, a similarity is determined between the second translated subset of text and that natural language text. In response to the similarity between the second translated subset of text and that natural language text being greater than the predetermined threshold, the second subset of text is identified as a contextual synonym of that natural language text.

In some implementations of method 200, the set of text is a first set of text, the occupational code is a first occupational code, the subset of text is a first subset of text, the set of natural language texts is a first set of natural language text, the predetermined threshold is a first predetermined threshold, and method 200 further includes receiving a second set of text (1) associated with a second occupational code different than the first occupational code and (2) in a third language (L3) different than the L1 and the L2. A second subset of text is extracted from the second set of text. The second subset of text is translated into the L2 to generate a second translated subset of text. A second set of natural language texts (1) associated with the second occupational code from the plurality of natural language texts, and (2) different than the first set of natural language text is identified. For each natural language text from the second set of natural language texts, a similarity between the second translated subset of text and that natural language text is determined. In response to the similarity between the second translated subset of text and that natural language text being greater than a second predetermined threshold different than the first predetermined threshold, the second subset of text is identified as a contextual synonym of that natural language text.

In some implementations of method 200, the set of text is a first set of text, the occupational code is a first occupational code, the subset of text is a first subset of text, the set of natural language texts is a first set of natural language texts, method 200 further includes receiving a second set of text (1) associated with a second occupational code different than the first occupational code and (2) in the L1. A second subset of text is extracted from the second set of text. The second subset of text is translated into the L2 to generate a second translated subset of text. A second set of natural language texts (1) associated with the second occupational code from the plurality of natural language texts, and (2) different than the first set of natural language texts is identified. For each natural language text from the second set of natural language texts, a similarity between the second translated subset of text and that natural language text is determined. In response to the similarity between the second translated subset of text and that natural language text being greater than the predetermined threshold, the second subset of text is identified as a contextual synonym of that natural language text.

In some implementations of method 200, the set of text is a first set of text, the occupational code is a first occupational code, the subset of text is a first subset of text, the set of natural language texts is a first set of natural language texts, the predetermined threshold is a first predetermined threshold, and method 200 further includes receiving a second set of text (1) associated with a second occupational code different than the first occupational code and (2) in the L1. A second subset of text is extracted from the second set of text. The second subset of text is translated into the L2 to generate a second translated subset of text. A second set of natural language texts (1) associated with the second occupational code from the plurality of natural language texts, and (2) different than the first set of natural language texts is identified. For each natural language text from the second set of natural language texts, a similarity between the second translated subset of text and that natural language text is determined. In response to the similarity between the second translated subset of text and that natural language text being greater than a second predetermined threshold different than the first predetermined threshold, the second subset of text is identified as a contextual synonym of that natural language text.

In some implementations of method 200, the set of text is a first set of text, the subset of text is a first subset of text, and method 200 further includes receiving a second set of text (1) associated with the occupational code and (2) in a third language (L3) different than the L1 and the L2. A second subset of text is extracted from the second set of text. The second subset of text is translated into the L2 to generate a second translated subset of text. For each natural language text from the set of natural language texts, a similarity between the second translated subset of text and that natural language text is determined. In response to the similarity between the second translated subset of text and that natural language text being greater than the predetermined threshold, the second subset of text is identified as a contextual synonym of that natural language text.

In some implementations of method 200, the set of text is a first set of text, the subset of text is a first subset of text, the predetermined threshold is a first predetermined threshold, and method 200 further includes receiving a second set of text (1) associated with the occupational code and (2) in a third language (L3) different than the L1 and the L2. A second subset of text is extracted from the second set of text. The second subset of text is translated into the language L2 to generate a second translated subset of text. For each natural language text from the set of natural language texts, a similarity between the second translated subset of text and that natural language text is determined. In response to the similarity between the second translated subset of text and that natural language text being greater than a second predetermined threshold different than the first predetermined threshold, the second subset of text is identified as a contextual synonym of that natural language text.

In some implementations of method 200, the set of text is a first set of text, the subset of text is a first subset of text, and method 200 further includes receiving a second set of text (1) associated with the occupational code and (2) in the language L1. A second subset of text is extracted from the second set of text. The second subset of text is translated into the language L2 to generate a second translated subset of text. For each natural language text from the set of natural language texts, a similarity between the second translated subset of text and that natural language text is determined. In response to the similarity between the second translated subset of text and that natural language text being greater than the predetermined threshold, the second subset of text is identified as a contextual synonym of that natural language text.

In some implementations of method 200, the set of text is a first set of text, the subset of text is a first subset of text, the predetermined threshold is a first predetermined threshold, and method 200 further includes receiving a second set of text (1) associated with the occupational code and (2) in the language L1. A second subset of text is extracted from the second set of text. The second subset of text is translated into the language L2 to generate a second translated subset of text. For each natural language text from the set of natural language texts, a similarity between the second translated subset of text and that natural language text is determined. In response to the similarity between the second translated subset of text and that natural language text being greater than a second predetermined threshold different than the first predetermined threshold, the second subset of text is identified as a contextual synonym of that natural language text.

In some implementations of method 200, extracting the subset of text from the set of text includes identifying skills and experiences from the set of text, where the skills and experiences are the subset of text. The skills and experiences could be, for example, soft skills, hard skills, prior experiences, accolades, certifications, personal attributes, and/or the like FIG. 3 shows a flowchart of a method 300 to determine that a subset of text in a first language is a contextual synonym of text in a second language, according to an embodiment. In some implementations, method 300 is performed by a processor (e.g., processor 102).

At 302, a subset of text (e.g., subset of text 114) associated with an occupational code and being in a first language (L1) is received. At 304, the subset of text is translated into a second language (L2) different than the L1 to generate a translated subset of text (e.g., translated subset of text 116). In some implementations, 304 is performed automatically (e.g., without human intervention) in response to completing 302. At 306, a set of natural language texts (e.g., set of NL texts 108) associated with the occupational code is identified from a plurality of natural language texts (e.g., set of NL texts 108, set of NL texts 110, etc.) (1) associated with a plurality of occupational codes and (2) being in the L2. Remaining natural language texts from the plurality of natural language texts are associated with remaining occupational codes from the plurality of occupational codes that does not include the occupational code. In some implementations, 306 is performed automatically (e.g., without human intervention) in response to completing 304. At 308, for each natural language text (e.g., NL text 108A, NL text 108B, etc.) from the set of natural language texts, to generate a contextual synonym database (e.g., contextual synonym database 118), and not for the remaining natural language texts from the plurality of natural langue texts, a similarity between the translated subset of text and that natural language text is determined. In some implementations, 308 is performed automatically (e.g., without human intervention) in response to completing 306. At 310, for each natural language text from the set of natural language texts, in response to the similarity between the translated subset of text and that natural language text being greater than a predetermined threshold, the subset of text is identified as a contextual synonym of that natural language text in the contextual synonym database. In some implementations, 310 is performed automatically (e.g., without human intervention) in response to completing 308.

In some implementations of method 300, the L1 is not English and the L2 is English. In some implementations of method 300, the similarity is determined using cosine similarity. In some implementations of method 300, the predetermined threshold is determined (e.g., by a processor, by a human, and/or the like) based on at least one of the occupational code or the language L1. In some implementations of method 300, the subset of text has at least one word and no more than five words.

Some implementations of method 300 further include, for at least one natural language text from the set of natural language texts, receiving at least one of a job description or a candidate profile that is in the language L1 and includes the subset of text and matching, using the contextual synonym database, (1) the at least one of the job description or the candidate profile that is in the language L1 and includes the subset of text to (2) at least one of a job description or a candidate profile that is in the language L2 and includes the at least one natural language text.

FIG. 4 shows a flowchart of a method 400 to determine that a subset of text being in multiple languages is a contextual synonym of natural language text that is in a language different than the multiple languages of the subset of text, according to an embodiment. In some implementations, method 400 is performed by a processor (e.g., processor 102).

At 402, a subset of text (e.g., subset of text 112) associated with an occupational code and being in a plurality of languages that does not include a predetermined language is received. At 404, the subset of text is translated to a translated subset of text (e.g., translated subset of text 116) that is in the predetermined language. In some implementations, 404 is performed automatically (e.g., without human intervention) in response to completing 402. At 406, a set of natural language texts (e.g., set of NL texts 108) associated with the occupational code and being in the predetermined language is identified from a plurality of sets of natural language texts (e.g., set of NL texts 108, set of NL texts 110, etc.) associated with a plurality of occupational codes that includes the occupational code. In some implementations, 406 is performed automatically (e.g., without human intervention) in response to completing 404. At 408, for each natural language text (e.g., NL text 108A, NL text 108B, etc.) from the set of natural language texts, and not for remaining sets of natural language text (e.g., NL text 110A, NL text 110B, etc.) from the plurality of sets of natural language texts associated with remaining occupational codes from the plurality of occupational codes, a similarity between the translated subset of text and that natural language text is determined. In some implementations, 408 is performed automatically (e.g., without human intervention) in response to completing 406. At 410, for each natural language text from the set of natural language texts, in response to the similarity being greater than a predetermined threshold, the subset of text is identified as a contextual synonym of that natural language text. In some implementations, 410 is performed automatically (e.g., without human intervention) in response to completing 408. At 412, for each natural language text from the set of natural language texts, in response to receiving at least one of a job description or a candidate profile that is one language from the plurality of languages and includes the subset of text, (1) the at least one of the job description or the candidate profile that is one language from the plurality of languages and includes the subset of text is matched to (2) at least one of a job description or a candidate profile that is in the predetermined language and includes that natural language text. In some implementations of method 400, the subset of text is at least one of a job description or a candidate profile.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the embodiments, "set" can refer to zero or more in some implementations, one or more in some implementations, and two or more in some implementations.

In the embodiments, as well as in the specification above, all transitional phrases such as "comprising." "including." "carrying." "having." "containing." "involving." "holding." "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A non-transitory processor-readable medium storing code representing instructions to be executed by one or more processors, the instructions comprising code to cause the one or more processors to:

receive a first set of text (1) associated with a first occupational code and (2) being in a first language (L1);

extract a first subset of text from the first set of text without human intervention;

translate, to generate a first translated subset of text and without human intervention, the first subset of text into a second language (L2) different than the L1;

vectorize the first translated subset of text to generate a vectorized version of the first translated subset of text;

identify a first set of natural language texts associated with the first occupational code from a plurality of natural language texts (1) associated with a plurality of occupational codes and (2) in the L2;

for each natural language text from the first set of natural language texts and not for remaining text from the first set of natural language texts:

vectorize that natural language text to generate a vectorized version of that natural language text;

determine, without human intervention, a similarity between the vectorized version of the first translated subset of text and the vectorized version of that natural language text, determine that the similarity between the vectorized version of the first translated subset of text and the vectorized version of that natural language text is greater than a first predetermined threshold associated with the first occupational code, in response to determining that the similarity between the vectorized version of the first translated subset of text and the vectorized version of that natural language text is greater than the first predetermined threshold, identify the first subset of text as a contextual synonym of that natural language text, the first predetermined threshold determined based on the first language, the second language, and the first occupational code, and in response to identifying the first subset of text as the contextual synonym of that natural language text, store the first subset of text as the contextual synonym of that natural language text in a contextual synonym database that is associated with the plurality of occupational codes;

for at least one natural language text from the first set of natural language texts and not for remaining text from the first set of natural language texts:

receive at least one of a job description or a candidate profile that is in the L1, is associated with the first occupational code, and includes the first subset of text, and match, using a portion of the contextual synonym database associated with the first occupational code and not remaining portions of the contextual synonym database associated with remaining occupational codes from the plurality of occupational codes, the first subset of text to the at least one natural language text;

receive a second set of text (1) associated with a second occupational code different than the first occupational code and (2) in the L1;

extract a second subset of text from the second set of text, the second subset of text identical to the first subset of text;

translate, to generate a second translated subset of text, the second subset of text into the L2;

identify a second set of natural language texts (1) associated with the second occupational code from the plurality of natural language texts and (2) different from the first set of natural language texts; and for each natural language text from the second set of natural language texts:

determine a similarity between the second translated subset of text and that natural language text, determine that the similarity between the second translated subset of text and that natural language text is below a second predetermined threshold different than the first predetermined threshold, and in response to determining that the similarity between the second translated subset of text and that natural language text is less than the second predetermined threshold, refrain from identifying the second subset of text as a contextual synonym of that natural language text.

2. The non-transitory processor-readable medium of claim 1, wherein the code further comprises code to cause the one or more processors to:

receive a third set of text (1) associated with a third occupational code different than the first occupational code and the second occupational code and (2) in a third language (L3) different than the L1 and the L2, the third set of text received in parallel with the first set of text;

extract a third subset of text from the third set of text;

translate, to generate a third translated subset of text, the third subset of text into the L2;

identify a third set of natural language texts (1) associated with the third occupational code from the plurality of natural language texts, and (2) different than the first set of natural language texts and the second set of natural language texts; and for each natural language text from the third set of natural language texts, determine a similarity between the third translated subset of text and that natural language text, and in response to the similarity between the third translated subset of text and that natural language text being greater than the first predetermined threshold, identify the third subset of text as a contextual synonym of that natural language text.

3. The non-transitory processor-readable medium of claim 1, wherein the plurality of natural language texts is stored in at least one first database, and the code further comprises code to cause the one or more processors to:

delete at least one natural language text from the plurality of natural language texts to generate at least one second database, a size of the at least one second database smaller than a size of the at least one first database; and update the contextual synonym database based on the at least one second database.

4. The non-transitory processor-readable medium of claim 1, wherein the code further comprises code to cause the one or more processors to:

receive a third set of text (1) associated with a third occupational code different than the first occupational code and the second occupational code and (2) in a third language (L3) different than the L1 and the L2;

extract a third subset of text from the third set of text;

translate, to generate a third translated subset of text, the third subset of text into the L2;

identify a third set of natural language texts (1) associated with the third occupational code from the plurality of natural language texts, and (2) different than the first set of natural language texts and the second set of natural language texts; and for each natural language text from the third set of natural language texts, determine a similarity between the third translated subset of text and that natural language text, and in response to the similarity between the third translated subset of text and that natural language text being greater than the first predetermined threshold, identify the third subset of text as a contextual synonym of that natural language text.

5. The non-transitory processor-readable medium of claim 1, wherein the code further comprises code to cause the one or more processors to:

receive a third set of text (1) associated with a third occupational code different than the first occupational code and the second occupational code and (2) in a third language (L3) different than the L1 and the L2;

extract a third subset of text from the third set of text;

translate, to generate a third translated subset of text, the third subset of text into the L2;

identify a third set of natural language texts (1) associated with the third occupational code from the plurality of natural language texts, and (2) different than the first set of natural language texts and the second set of natural language texts; and for each natural language text from the third set of natural language texts, determine a similarity between the third translated subset of text and that natural language text, and in response to the similarity between the third translated subset of text and that natural language text being greater than a third predetermined threshold different than the first predetermined threshold and the second predetermined threshold, identify the third subset of text as a contextual synonym of that natural language text, the third predetermined threshold determined based on the second language, the third language, and the third occupational code.

6. The non-transitory processor-readable medium of claim 1, wherein the code further comprises code to cause the one or more processors to:

receive a third set of text (1) associated with a third occupational code different than the first occupational code and the second occupational code and (2) in the L1;

extract a third subset of text from the third set of text;

translate, to generate a third translated subset of text, the third subset of text into the L2;

identify a third set of natural language texts (1) associated with the third occupational code from the plurality of natural language texts, and (2) different than the first set of natural language texts and the second set of natural language texts; and for each natural language text from the third set of natural language texts, determine a similarity between the third translated subset of text and that natural language text, and in response to the similarity between the third translated subset of text and that natural language text being greater than the first predetermined threshold, identify the third subset of text as a contextual synonym of that natural language text.

7. The non-transitory processor-readable medium of claim 1, wherein the code further comprises code to cause the one or more processors to:

receive a third set of text (1) associated with a third occupational code different than the first occupational code and the second occupational code and (2) in the L1;

extract a third subset of text from the third set of text;

translate, to generate a third translated subset of text, the third subset of text into the L2;

identify a third set of natural language texts (1) associated with the third occupational code from the plurality of natural language texts, and (2) different than the first set of natural language texts and the second set of natural language texts; and for each natural language text from the third set of natural language texts, determine a similarity between the third translated subset of text and that natural language text, and in response to the similarity between the third translated subset of text and that natural language text being greater than a third predetermined threshold different than the first predetermined threshold and the second predetermined threshold, identify the third subset of text as a contextual synonym of that natural language text, the third predetermined threshold determined based on the first language, the second language, and the third occupational code.

8. The non-transitory processor-readable medium of claim 1, wherein the code further comprises code to cause the one or more processors to:

receive a third set of text (1) associated with the first occupational code and (2) in a third language (L3) different than the L1 and the L2;

extract a third subset of text from the third set of text;

translate, to generate a third translated subset of text, the third subset of text into the L2;

for each natural language text from the first set of natural language texts, determine a similarity between the third translated subset of text and that natural language text, and in response to the similarity between the third translated subset of text and that natural language text being greater than the first predetermined threshold, identify the third subset of text as a contextual synonym of that natural language text.

9. The non-transitory processor-readable medium of claim 1, wherein the code further comprises code to cause the one or more processors to:

receive a third set of text (1) associated with the first occupational code and (2) in a third language (L3) different than the L1 and the L2;

extract a third subset of text from the third set of text;

translate, to generate a third translated subset of text, the third subset of text into the L2;

for each natural language text from the first set of natural language texts, determine a similarity between the third translated subset of text and that natural language text, and in response to the similarity between the third translated subset of text and that natural language text being greater than a third predetermined threshold different than the first predetermined threshold and the second predetermined threshold, identify the third subset of text as a contextual synonym of that natural language text, the third predetermined threshold determined based on the second language, the third language, and the first occupational code.

10. The non-transitory processor-readable medium of claim 1, wherein the code further comprises code to cause the one or more processors to:
receive a third set of text (1) associated with the first occupational code and (2) in the L1;
extract a third subset of text from the third set of text;
translate, to generate a third translated subset of text, the third subset of text into the L2;
for each natural language text from the first set of natural language texts,
determine a similarity between the third translated subset of text and that natural language text, and
in response to the similarity between the third translated subset of text and that natural language text being greater than the first predetermined threshold, identify the third subset of text as a contextual synonym of that natural language text.

11. The non-transitory processor-readable medium of claim 1, wherein the code further comprises code to cause the one or more processors to:
receive a third set of text (1) associated with the first occupational code and (2) in the L1;
extract a third subset of text from the third set of text;
translate, to generate a third translated subset of text, the third subset of text into the L2;
for each natural language text from the first set of natural language texts,
determine a similarity between the third translated subset of text and that natural language text, and
in response to the similarity between the third translated subset of text and that natural language text being greater than a third predetermined threshold different than the first predetermined threshold and the second predetermined threshold, identify the third subset of text as a contextual synonym of that natural language text.

12. The non-transitory processor-readable medium of claim 1, wherein code to extract the first subset of text from the first set of text includes code to cause the one or more processors to:
identify skills and experiences from the first set of text, the skills and experiences being the first subset of text.

13. An apparatus, comprising:
a memory; and
a processor operatively coupled to the memory and configured to:
receive a first subset of text associated with a first occupational code and being in a first language (L1);
translate, to generate a first translated subset of text and without human intervention, the first subset of text into a second language (L2) different than the L1;
vectorize the first translated subset of text to generate a vectorized version of the first translated subset of text;
identify a first set of natural language texts associated with the first occupational code from a plurality of natural language texts that are (1) grouped based on a plurality of occupational codes and (2) in the L2, remaining natural language texts from the plurality of natural language texts associated with remaining occupational codes from the plurality of occupational codes that does not include the first occupational code;
for each natural language text from the first set of natural language texts, to generate a contextual synonym database associated with the plurality of occupational codes, and not for the remaining natural language texts from the plurality of natural language texts:
vectorize that natural language text to generate a vectorized version of that natural language text,
determine, without human intervention, a similarity between the vectorized version of the first translated subset of text and the vectorized version of that natural language text,
determine that the similarity between the vectorized version of the first translated subset of text and the vectorized version of that natural language text is not greater than a first predetermined threshold associated with the first occupational code,
in response to determining that the similarity between the vectorized version of the first translated subset of text and the vectorized version of that natural language text is not greater than the first predetermined threshold, refrain from identifying the first subset of text as a contextual synonym of that natural language text in the contextual synonym database, the first predetermined threshold determined based on the first language, the second language, and the first occupational code;
receive at least one of a job description or a candidate profile that is in the L1, is associated with the first occupational code, and includes the first subset of text;
match, using a portion of the contextual synonym database associated with the first occupational code and not remaining portions of the contextual synonym database associated with remaining occupational codes from the plurality of occupational codes, the first subset of text to at least one natural language text from the plurality of natural language texts;
receive a second set of text (1) associated with a second occupational code different than the first occupational code and (2) in the L1;
extract a second subset of text from the second set of text, the second subset of text identical to the first subset of text;
translate, to generate a second translated subset of text, the second subset of text into the L2;
identify a second set of natural language texts (1) associated with the second occupational code from the plurality of natural language texts and (2) different from the first set of natural language texts; and
for each natural language text from the second set of natural language texts:
determine a similarity between the second translated subset of text and that natural language text,
determine that the similarity between the second translated subset of text and that natural language text is above a second predetermined threshold different than the first predetermined threshold, and
in response to determining that the similarity between the second translated subset of text and that natural language text is above than the second predetermined threshold, identify the second subset of text as a contextual synonym of that natural language text.

14. The apparatus of claim 13, wherein the L1 is not English and the L2 is English.

15. The apparatus of claim 13, wherein the similarity is determined using cosine similarity.

16. The apparatus of claim 13, wherein the first subset of text has at least one word and no more than five words.

17. A method, comprising:
  receiving, via a processor, a first subset of text associated with a first occupational code and being in a plurality of languages that does not include a predetermined language;
  translating, via the processor and without human intervention, the first subset of text to a first translated subset of text that is in the predetermined language;
  vectorize the first translated subset of text to generate a vectorized version of the first translated subset of text;
  identifying, via the processor and from a plurality of sets of natural language texts associated with a plurality of occupational codes that includes the first occupational code, a first set of natural language texts associated with the first occupational code and being in the predetermined language;
  for each natural language text from the first set of natural language texts, and not for remaining sets of natural language text from the plurality of sets of natural language texts associated with remaining occupational codes from the plurality of occupational codes:
    vectorizing that natural language text to generate a vectorized version of that natural language text,
    determining, via the processor and without human intervention, a similarity between the vectorized version of the first translated subset of text and the vectorized version of that natural language text, and
    in response to the similarity being greater than a first predetermined threshold, identifying, via the processor, the first subset of text as a contextual synonym of that natural language text in a contextual synonym database, the first predetermined threshold determined based on the predetermined language and the first occupational code,
  receiving, via the processor, a second subset of text associated with a second occupational code different than the first occupational code and being in the predetermined language;
  translating, via the processor and without human intervention, the second subset of text to a second translated subset of text that is in the predetermined language;
  identifying, via the processor and from the plurality of sets of natural language texts associated with the plurality of occupational codes, a second set of natural language texts associated with the second occupational code and being in the predetermined language;
  for each natural language text from the second set of natural language texts, and not for remaining sets of natural language text from the plurality of sets of natural language texts associated with remaining occupational codes from the plurality of occupational codes:
    vectorizing that natural language text to generate a vectorized version of that natural language text,
    determining, via the processor and without human intervention, a similarity between the vectorized version of the first translated subset of text and the vectorized version of that natural language text, and
    in response to the similarity being greater than a second predetermined threshold different than the first predetermined threshold, identifying, via the processor, the first subset of text as the contextual synonym of that natural language text in the contextual synonym database, the second predetermined threshold determined based on the predetermined language and the second occupational code.

18. The method of claim 17, wherein the first subset of text is at least one of a job description or a candidate profile.

* * * * *